(12) United States Patent  (10) Patent No.: US 7,672,479 B2
Kehley et al.  (45) Date of Patent: Mar. 2, 2010

(54) LOW MAINTENANCE FLAT MAIL LINE SCAN CAMERA SYSTEM

(75) Inventors: Glenn L. Kehley, Endicott, NY (US); Gregory Reyner, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1135 days.

(21) Appl. No.: 11/209,532

(22) Filed: Aug. 23, 2005

(65) Prior Publication Data

US 2006/0120563 A1  Jun. 8, 2006

Related U.S. Application Data

(60) Provisional application No. 60/635,103, filed on Dec. 10, 2004, provisional application No. 60/634,300, filed on Dec. 8, 2004.

(51) Int. Cl.
*G06K 9/00* (2006.01)

(52) U.S. Cl. ..................................... 382/101

(58) Field of Classification Search ......... 382/100–102; 705/400, 401; 250/239, 559.22, 236, 566, 250/568, 570, 234; 235/462.01, 454, 462.22, 235/462.24, 472.01, 462.14; 702/156, 159, 702/170, 172
See application file for complete search history.

(56) References Cited

U.S. PATENT DOCUMENTS

| | | | |
|---|---|---|---|
| 5,902,993 A | 5/1999 | Okushiba et al. | |
| 6,629,641 B2 * | 10/2003 | Tsikos et al. | 235/462.01 |
| 6,830,184 B2 | 12/2004 | Tsikos et al. | |
| 7,105,135 B2 * | 9/2006 | Terry et al. | 422/119 |
| 2002/0043561 A1 | 4/2002 | Tsikos et al. | |
| 2002/0130257 A1 * | 9/2002 | Krohn et al. | 250/239 |
| 2002/0145042 A1 | 10/2002 | Knowles et al. | |
| 2003/0019931 A1 | 1/2003 | Tsikos et al. | |
| 2003/0019932 A1 | 1/2003 | Tsikos et al. | |
| 2003/0019933 A1 | 1/2003 | Tsikos et al. | |
| 2003/0024987 A1 | 2/2003 | Zhu | |
| 2003/0034387 A1 | 2/2003 | Knowles et al. | |
| 2003/0034395 A1 | 2/2003 | Tsikos et al. | |
| 2003/0034396 A1 | 2/2003 | Tsikos et al. | |
| 2003/0034447 A1 | 2/2003 | Krohn et al. | |
| 2003/0035460 A1 | 2/2003 | Tsikos et al. | |
| 2003/0035461 A1 | 2/2003 | Tsikos et al. | |
| 2003/0038179 A1 | 2/2003 | Tsikos et al. | |
| 2003/0042303 A1 | 3/2003 | Tsikos et al. | |
| 2003/0042304 A1 | 3/2003 | Knowles et al. | |

(Continued)

*Primary Examiner*—Samir A. Ahmed
*Assistant Examiner*—Atiba O Fitzpatrick
(74) *Attorney, Agent, or Firm*—Wolf, Greenfield & Sacks, P.C.; Randy J. Pritzker

(57) ABSTRACT

A camera assembly is disclosed which may be implemented on a mail processing system for photographing flats mail items. In one embodiment, the assembly includes lighting components (e.g., light emitting diodes) which are capable of projecting light toward a mail item in a viewing station at a specific angle, which angle may be adjusted to reduce the amount of specular reflection from an item toward a camera. The lighting components may reside in a nose unit which may be easily attached to and detached from the housing for ease of maintenance. The nose unit may be attachable to the housing in a manner which seals the camera and lighting components off from the operating environment, such that airborne dust and debris does not enter the housing or nose unit and damage the camera or lighting components.

10 Claims, 7 Drawing Sheets

U.S. PATENT DOCUMENTS

| | | |
|---|---|---|
| 2003/0042309 A1 | 3/2003 | Tsikos et al. |
| 2003/0042314 A1 | 3/2003 | Tsikos et al. |
| 2003/0042315 A1 | 3/2003 | Tsikos |
| 2003/0047597 A1 | 3/2003 | Knowles et al. |
| 2003/0052169 A1 | 3/2003 | Tsikos et al. |
| 2003/0052175 A1 | 3/2003 | Tsikos et al. |
| 2003/0053513 A1 | 3/2003 | Vatan et al. |
| 2003/0062414 A1 | 4/2003 | Tsikos et al. |
| 2003/0062415 A1 | 4/2003 | Tsikos et al. |
| 2003/0071119 A1 | 4/2003 | Tsikos et al. |
| 2003/0071122 A1 | 4/2003 | Tsikos et al. |
| 2003/0071123 A1 | 4/2003 | Tsikos et al. |
| 2003/0071124 A1 | 4/2003 | Tsikos et al. |
| 2003/0071128 A1 | 4/2003 | Tsikos et al. |
| 2003/0080190 A1 | 5/2003 | Tsikos et al. |
| 2003/0080192 A1 | 5/2003 | Tsikos et al. |
| 2003/0085280 A1 | 5/2003 | Tsikos et al. |
| 2003/0085281 A1 | 5/2003 | Knowles et al. |
| 2003/0089778 A1 | 5/2003 | Tsikos et al. |
| 2003/0094495 A1 | 5/2003 | Knowles et al. |
| 2003/0098349 A1 | 5/2003 | Tsikos et al. |
| 2003/0098353 A1 | 5/2003 | Tsikos et al. |
| 2003/0102379 A1 | 6/2003 | Tsikos et al. |
| 2003/0117545 A1 | 6/2003 | Coker et al. |
| 2003/0218070 A1 | 11/2003 | Tsikos et al. |
| 2004/0011949 A1 | 1/2004 | Bluemcke et al. |
| 2004/0021064 A1 | 2/2004 | Baudat |
| 2004/0108982 A1 | 6/2004 | Krohn |
| 2004/0119005 A1 | 6/2004 | Krohn et al. |

* cited by examiner

LOW MAINTENANCE FLAT MAIL LINE SCAN CAMERA SYSTEM

CROSS-REFERENCE TO RELATED APPLICATIONS

This application claims priority under 35 USC §119(e) to U.S. Provisional Applications having Ser. Nos. 60/635,103 and 60/634,300.

FIELD OF INVENTION

This invention relates generally to line scan camera assemblies, and more particularly to line scan camera assemblies which are fixed in a stationary position while objects to be photographed are conveyed past.

BACKGROUND OF INVENTION

Line scan cameras have been implemented in numerous industrial and commercial settings, such as on high-speed mail sorting systems. In one exemplary implementation, a line scan camera may be fixed in a stationary position and mail items may be conveyed to a viewing station within the camera's field of view via a conveyor path. As the mail items reach the viewing station, they may be scanned or photographed by the camera. Image data captured by the camera may be decoded or otherwise processed by a signal processing circuit.

Often, line scan cameras are implemented on mail sorting systems as part of a camera assembly. For example, many line scan cameras reside in a housing which protects the camera's components from the operating environment. The camera assembly may, for example, define an aperture which provides the camera with a field of view toward mail items on the conveyor path. In addition, because many line scan cameras require a mail item to be illuminated with relatively bright light to capture an accurate image, the camera assembly may include lighting components, such as fluorescent, halogen or sodium vapor lamps, to illuminate an item in the viewing station. Further, many camera assemblies include components to aerate and/or cool the assembly, since lighting and/or image capture components may produce sufficient heat to reduce the useful life of other components inside the housing.

Some conventional line scan cameras employ a charge-coupled device (CCD), which is a device comprising an array of photosensitive elements that produces image data in the form of an array of pixels. The CCD typically provides this image data to a signal processing circuit for decoding and processing. The signal processing circuit may reside in a computer external to the camera assembly.

SUMMARY OF INVENTION

In one embodiment, a camera assembly is provided for use in a mail processing system, the camera assembly comprising a camera with a line of view via an aperture toward a viewing station in the mail processing system, the mail processing system being configured to transport a mail item through the viewing station in a direction which is substantially perpendicular to the line of view of the camera, the camera assembly comprising a plurality of lighting components configured to project light toward the viewing station, the plurality of lighting components being disposed to project light toward the viewing station such that the light does not travel via the aperture, at least a portion of the plurality of lighting components being configured to project light toward the viewing station at a substantially precise angle with respect to the line of view, the angle being at least twenty degrees from the line of view. The plurality of lighting components may comprise, for example, light-emitting diodes.

In another embodiment, a camera assembly is provided for use in a mail processing system, the camera assembly comprising a camera with a line of view via an aperture toward a viewing station in the mail processing system, the camera being in communication with a signal processing circuit, the camera comprising a charged-coupled device for capturing image data, the charged-coupled device comprising an array of photosensitive elements, the array having a vertical axis and a horizontal axis, the vertical axis corresponding to a height of the mail item in the viewing station and the horizontal axis corresponding to a direction in which the item is conveyed through the viewing station, the camera being operable to provide image data captured by the array of photosensitive elements to the signal processing circuit, the signal processing circuit being operable to synchronize the image data captured by the photosensitive elements across the horizontal axis upon the mail item being conveyed through the viewing station, the camera assembly further comprising a plurality of lighting components for projecting light toward the viewing station, at least a portion of the plurality of lighting components being capable of projecting light toward the viewing station at a substantially precise angle with respect to the line of view, the plurality of lighting components being disposed on a plurality of support structures, the support structures being separately configurable to project light toward the item at an angle to the line of view.

In yet another embodiment, a camera assembly is provided for use in a mail processing system, the camera assembly comprising a camera with a line of view via an aperture toward a viewing station in the mail processing system, the camera assembly further comprising a housing in which the camera is disposed, a plurality of lighting components for illuminating the viewing station, and a nose unit configured for attachment to and detachment from the housing, the plurality of lighting components residing in the nose unit, the housing and nose unit being attached in a manner preventing airborne debris from entering the housing, at least a portion of the plurality of lighting components being capable of projecting light toward the viewing station at a substantially precise angle with respect to the line of view, the plurality of lighting components being disposed on a plurality of support structures, the support structures being separately configurable to project light toward the item at an angle to the line of view.

BRIEF DESCRIPTION OF DRAWINGS

In the drawings, in which like reference characters designate like or corresponding parts throughout the several views.

DETAILED DESCRIPTION

Figure 1:
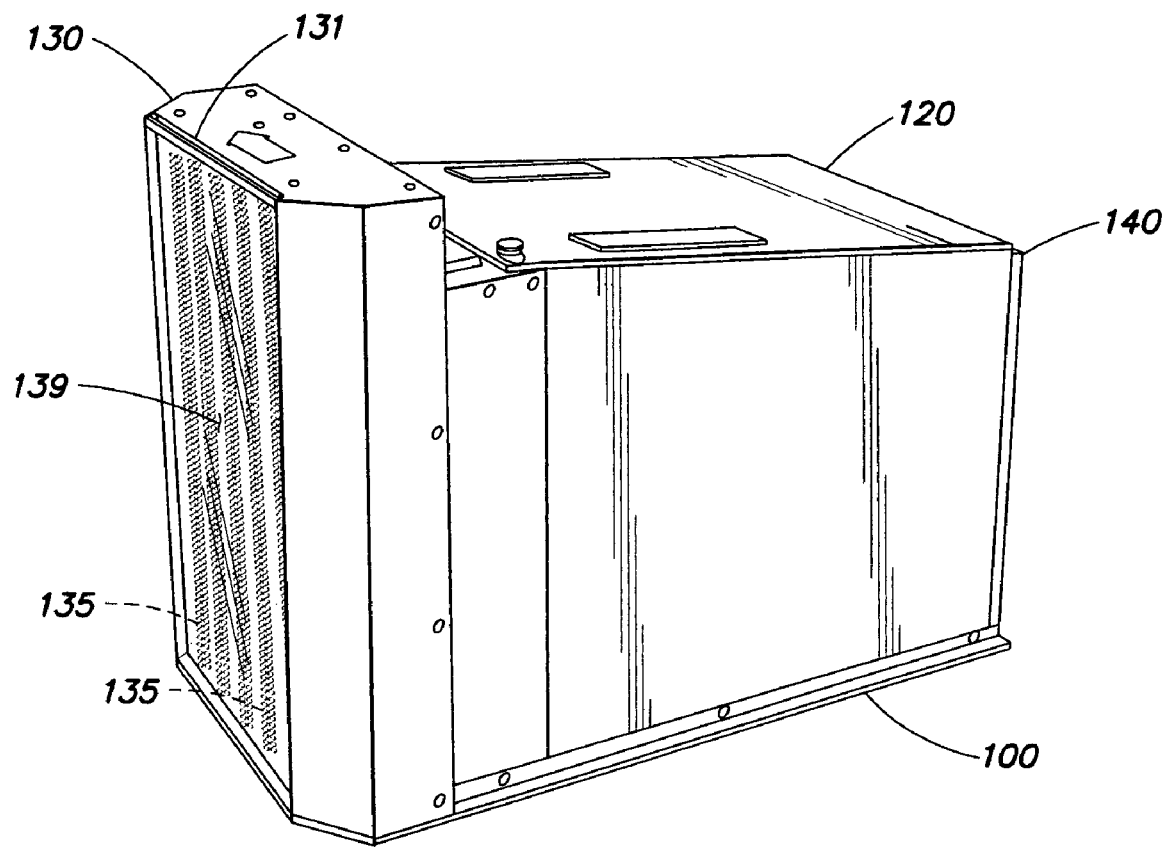
FIG. 1 is an elevational view of a fully constructed camera assembly, according to one embodiment of the invention.

One embodiment of the present invention provides a line scan camera assembly which is equipped to capture image data representative of flats mail pieces. Flats mail pieces may include magazines, newspapers, packages, catalogs, large envelopes and other articles having dimensions which are predefined by an organization such as the U.S. Postal Service (USPS) or other postal or freight processing service. In general, flats mail items are taller when standing on-edge than letter-size mail pieces. Accordingly, one embodiment of the invention provides a camera assembly including a more expansive (e.g., taller) CCD than that which is typically employed by conventional line scan cameras to capture an image of letter mail items. For example, one embodiment includes a CCD having an array of photosensitive elements with a vertical axis of 4096 elements, such that a vertical axis of 4096 pixels may be provided to a signal processing circuit for decoding. As a result, the CCD may accommodate flats items which have greater height than letter items. A CCD having a longer vertical axis may, for example, facilitate image capture of taller flats items at high enough resolution so that information provided within the image may be satisfactorily decoded. In addition, one embodiment of the invention provides a camera assembly which defines a taller aperture than those that are provided by conventional camera assemblies, thereby allowing a camera within the housing a more elongated field of view, corresponding to the vertical axis of the CCD, to capture images of flats items.

One embodiment of the invention provides a camera assembly designed for maintainability, reliability and operational flexibility. For example, in one embodiment, the assembly may comprise a housing which shields components contained therein from the operating environment. For example, the housing may prevent dust from entering the housing and settling on camera components, which may degrade image capture quality.

In one embodiment, a camera assembly is provided which comprises lighting and image capture components that produce very little heat, which can be harmful to camera components and be hazardous to an operator if not controlled. For example, in one embodiment, illumination of a mail item may be accomplished via light emitting diodes (LEDs), such as white LEDs, which produce very little heat in comparison to the fluorescent, halogen or sodium vapor lamps typically employed by conventional camera assemblies. Further, one embodiment of the invention may comprise thermally conductive materials to transmit heat produced by its components to the environment (e.g., to a surface on which the camera assembly is mounted). As such, in one embodiment the camera assembly may require no aeration or cooling components which could otherwise introduce dusty air into the housing and/or unnecessarily consume electrical power.

Because LEDs have a much longer useful life than fluorescent, halogen or sodium vapor lamps, embodiments which employ LEDs may need to be taken out of service much less frequently than conventional camera assemblies. Additionally, in one embodiment, the assembly's lighting components reside in a modular, "pluggable" nose unit which may be easily detached and reattached by an operator, so as to service (e.g., replace) lighting components. Even further, because the nose unit may be easily removed and replaced, an operator may remove a first nose unit to service the lighting components therein and immediately replace it with a second nose unit so as to minimize the time that the camera assembly is out of service.

In one embodiment, the camera assembly compensates for the relatively low level of illumination generally produced by LEDs (i.e. in comparison with fluorescent, halogen or sodium vapor lamps) via a variable f-stop (i.e., lens aperture) and a time-delay integration (TDI) CCD chip. That is, many conventional camera assemblies employ fluorescent, halogen or sodium vapor lamps in spite of their short life and the heat they produce because the cameras residing therein require very bright light to capture image data accurately. The bright light requirement is partly due to the fact that expanding a camera's lens aperture allows light (and thus image data) to enter but can also make the camera very sensitive to movement of an item being photographed. As a result, many camera assemblies employ a narrow lens aperture but very bright light (e.g., that which is produced by fluorescent, halogen or sodium vapor lamps). However, in accordance with one embodiment of the invention, a wider lens aperture is employed, which reduces the amount of light required to properly illuminate the item being scanned, and Time Delay Integration (TDI) functionality is employed to maximize the image capture (i.e., light gathering) capability of the CCD. TDI functionality is well-known in the art, and involves capturing a quantity of vertical pixel lines as an item proceeds past the camera and synchronizing the pixel lines (e.g., employing a signal processing circuit) into a single scan line. As a result of employing a wide lens aperture with a TDI CCD, the camera assembly may employ LEDs, which typically use less energy than conventional lamps and produce less heat, thereby decreasing the cost of operating the camera assembly.

In addition, because LEDs may direct light at an item with greater specificity than conventional fluorescent, halogen or sodium vapor lamps (which are typically glowing bulbs that project light in all directions), in one embodiment, the camera assembly may include equipment, such as one or more mechanical supports, by means of which the light produced by the LEDs may be directed at a specific area on the item, or at a specific angle toward the item. Directing light toward an item at a specific angle may, for example, serve to reduce specular reflection (i.e., light reflected directly from the item toward the camera lens and CCD) and thus improve image capture quality. In this respect, it should be appreciated that a substantial portion of flats pieces processed by the U.S. Postal Service are either wrapped in plastic or polyethylene or windowed with a clear, transparent material such as cellophane, polystyrene or glassine, which when wrinkled or creased may tend to create specular reflection. Applicants have appreciated that positioning the lighting components to project light toward the item at a specific angle of incidence may allow greater control over the angle of reflection, thereby preventing the light from being directly reflected toward the camera lens and CCD. For example, in one embodiment, lighting components are positioned such that light is not projected toward the viewing station via an aperture formed by the camera assembly. For example, lighting components may be disposed in a wider position with respect to the aperture than in conventional assemblies, in order to project light toward the viewing station at a more glancing angle. One or more of the lighting components may be disposed, as an example, in a nose unit which may be detached and/or attached from the housing easily. Accordingly, one embodiment of the invention may provide a camera assembly with an ability to reduce specular reflection and thus improved ability to accurately photograph hard-to-read items.

Figure 2:
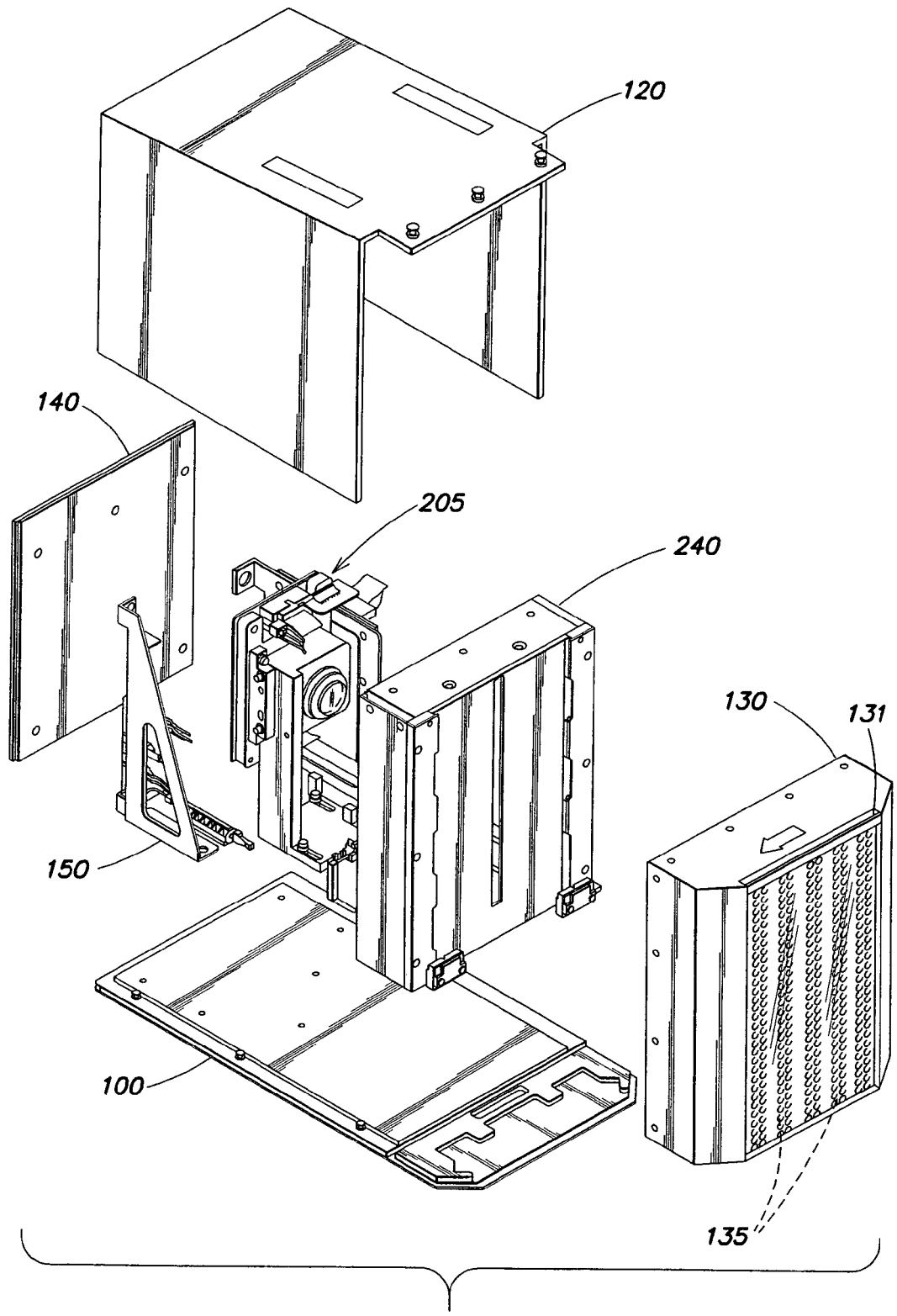
FIG. 2 is an elevational exploded side view of a camera assembly, according to one embodiment of the invention.
Figure 3:
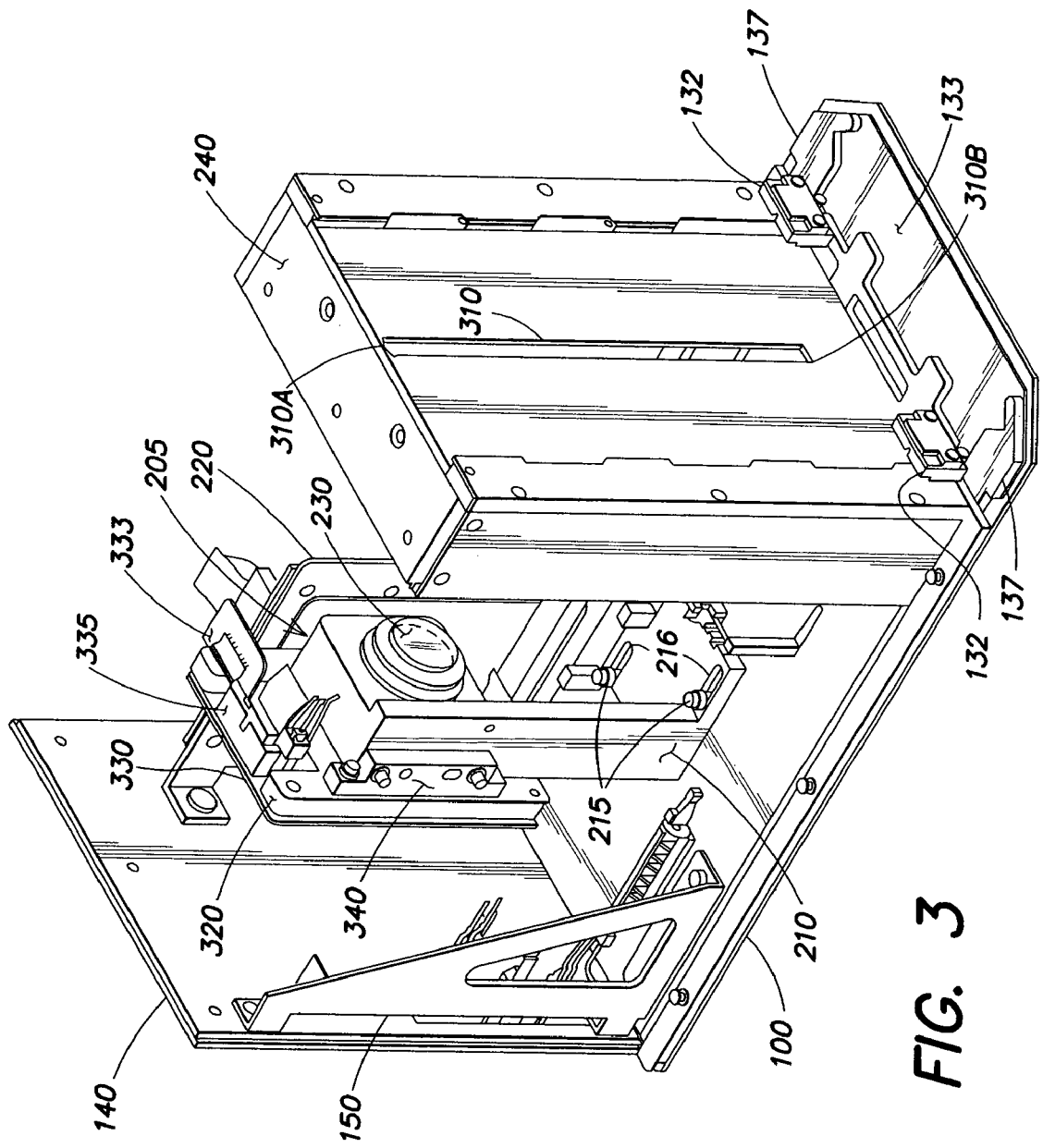
FIG. 3 is an elevational side view of a camera assembly having its cover and lighting component removed to expose components residing therein, according to one embodiment of the invention.
Figure 4:
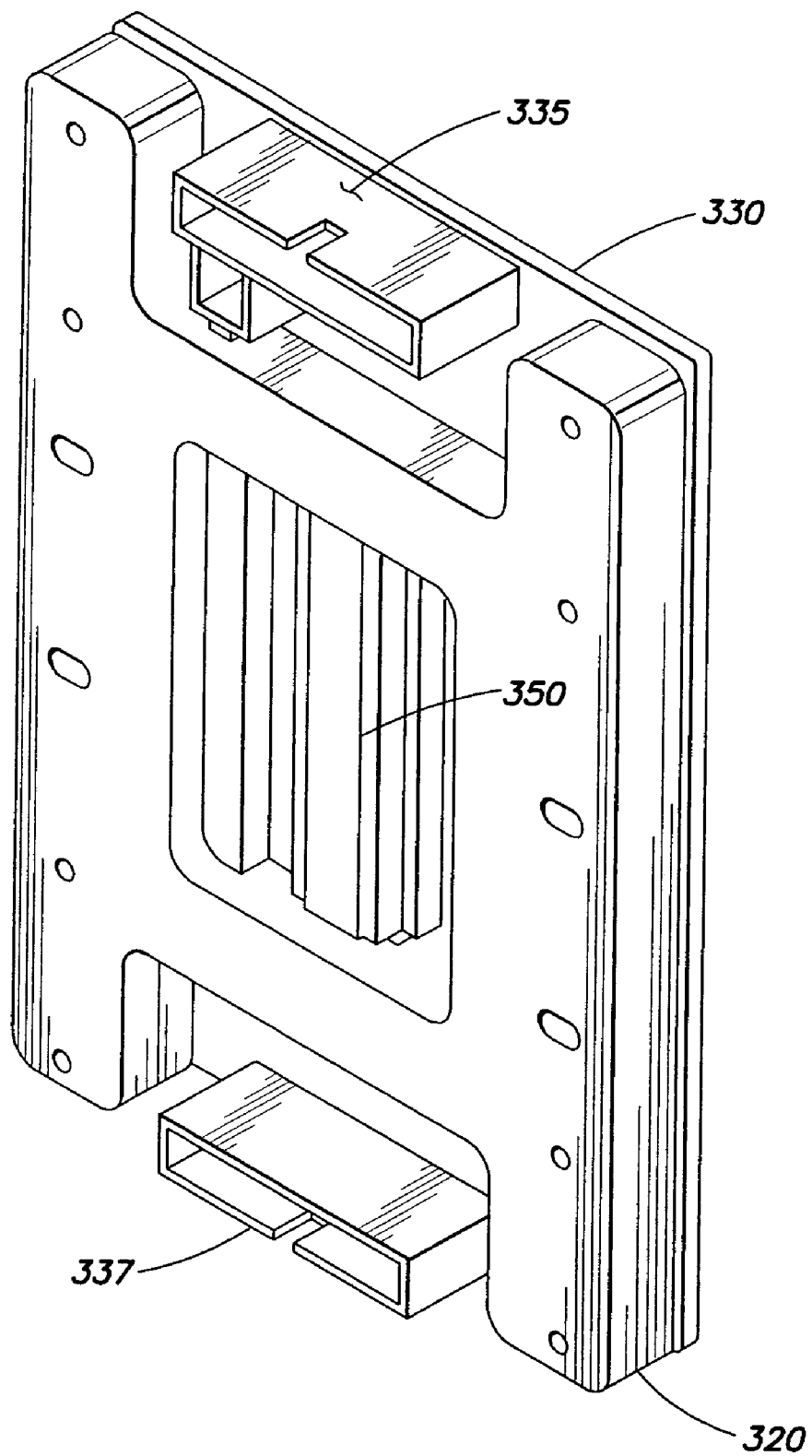
FIG. 4 is a front perspective view of an array card and charge-coupled device employed by a camera assembly according to one embodiment of the invention.
Figure 5:
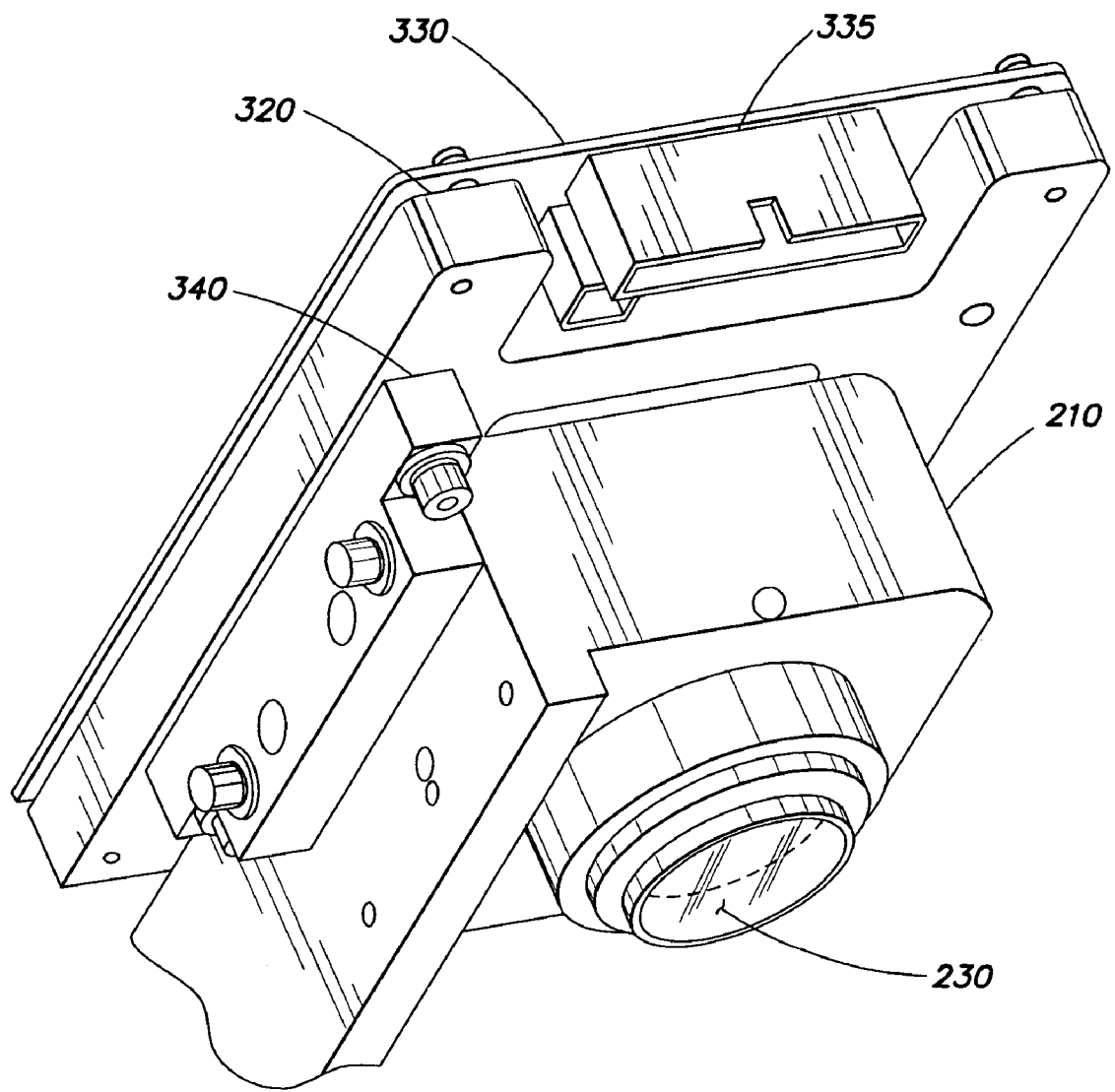
FIG. 5 is a top perspective view of an array card mounted to an optical bench according to one embodiment of the invention.
Figure 6:
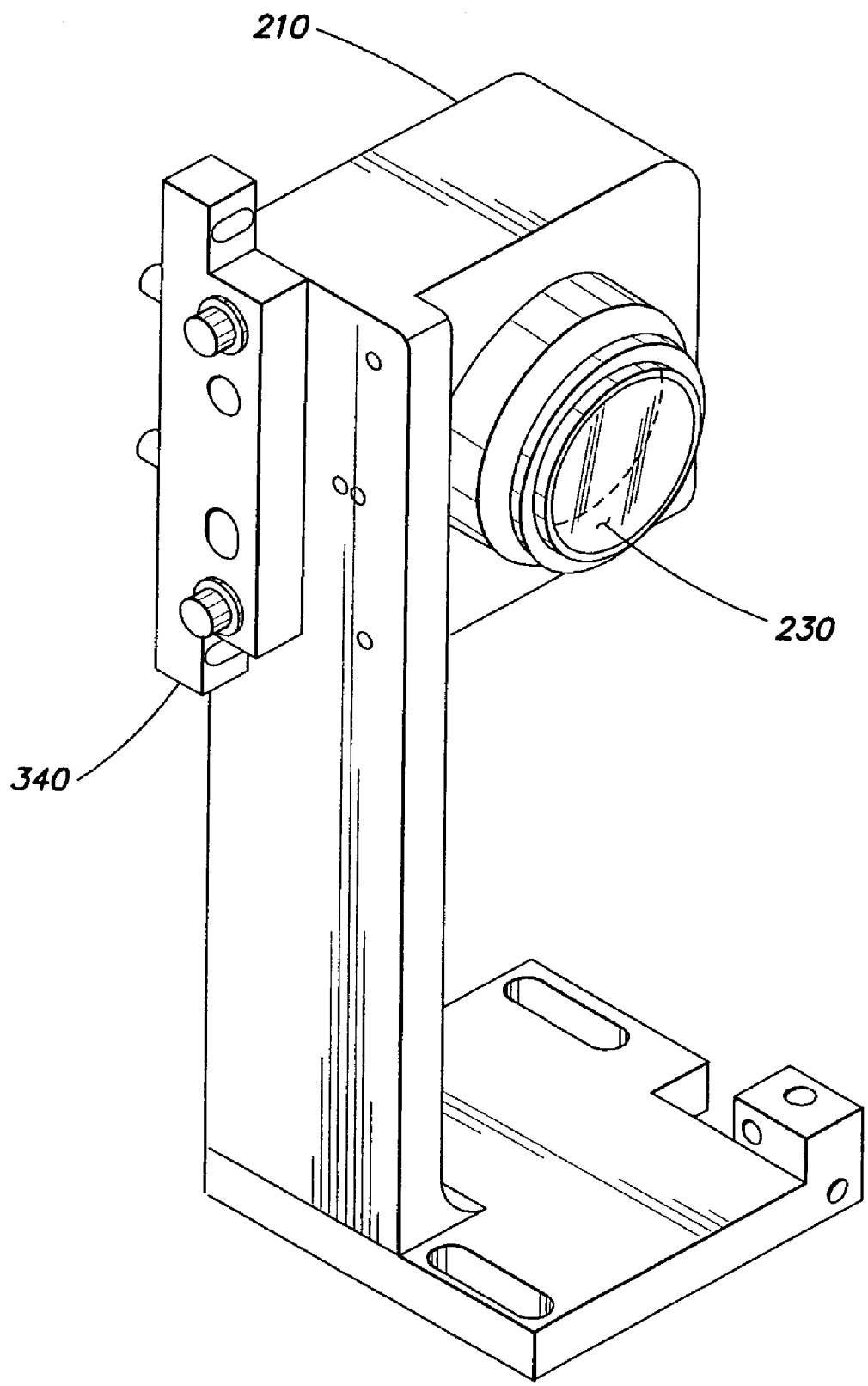
FIG. 6 is a top perspective view of an optical bench including an optical lens according to one embodiment of the invention.

FIGS. 1-3 illustrate various aspects of a camera assembly provided in accordance with one embodiment of the invention. The exemplary camera assembly shown includes base plate 100, which provides a foundation for several other components. In one embodiment, base plate 100 is composed of a lightweight metal (e.g., aluminum) so that an operator may lift and handle the assembly easily. In the exemplary embodiment shown, base plate 100 is substantially rectangular in shape and includes various physical features designed to mate with corresponding features on sub-assembly components. For example, base plate 100 includes ridge 137, which is designed to mate with a corresponding recess on nose unit 130 to help fix the nose unit in a stationary position on base plate 100 when the nose unit is placed thereon. In addition, nose unit 130 and other sub-assemblies may be affixed on base plate 100 via one or more fasteners. For example, front frame structure 240, back plate 140, camera interface board 220, and optical bench assembly 210 each may be attached to base plate 100 via screws or any other suitable fastener.

In one embodiment, base plate 100 may be composed of material which allow it to create a grounding path for electrostatic discharge (ESD) produced by various components residing therein. For example, base plate 100 may be provided with a chromate conversion to provide conductivity. In another example, base plate 100 may include a mounting screw port for receiving a fastener to mount the camera assembly to a surface (e.g., the surface of a mail sorting assembly), and the screw port may be fitted with a ground strap which may be attached to the surface to provide a grounding path from camera assembly components via base plate 100 to the surface. In one embodiment, plates which form front frame structure 240 may also be electrically conductive and set on dowel pins on base plate 100 to create a continuous grounding path.

Cover 120 attaches to base plate 100, back plate 140 and front frame structure 240. Cover 120 may form a protective shell which shields components residing in the assembly from damage. In one embodiment, cover 120 may attach to base plate 100, back plate 140 and front frame structure in a manner which forms a seal preventing the entry of airborne dust and debris (which may be typical of some operating environments, such as mail processing facilities) into the assembly.

In one embodiment, cover 120 may be composed of aluminum, thus providing a grounding path which further protects against ESD. Cover 120 may also protect camera components against electromagnetic interference (EMI). In one embodiment, cover 120 may include handles which may assist an operator in lifting, handling and/or carrying the camera assembly.

In one embodiment, cover 120, back plate 140 and/or front frame structure 240, or portions thereof, may be anodized, thereby creating a thin aluminum oxide film of extreme hardness which may shield components residing therein from physical damage. (Certain portions may receive chromate conversion instead of being anodized to provide conductivity.) In addition, the black color of aluminum oxide may help to absorb ambient light in the operating area, thereby minimizing the probability of specular reflection toward the camera.

In one embodiment, nose unit 130 is a modular unit, in that it may be easily attached to and detached from the front frame structure of the camera assembly. For example, in addition to the recess which is designed to mate with ridge 137, nose unit 130 may also include one or more ridges designed to mate with slots 241 such that an operator may position the nose unit above front frame structure 240 with the ridges in registration with slots 241, and slide nose unit 130 downward toward base plate 100 to lock it in place with respect to front frame structure 240 and base plate 100. However, the invention is not limited to such an implementation. For example, in one embodiment an operator may simply position nose unit to register with ridge 137 in order to attach it to the front frame structure of the camera assembly, without having to position the nose unit 130 to register with slots 241. In accordance with this embodiment it may be possible to attach the nose unit in operating areas with limited clearance over the housing. For example, the nose unit may be attached to the front frame structure of the camera assembly from the front or sides of the assembly, rather than from above the assembly.

In one embodiment, sliding nose unit 130 into place in this manner may cause it to become engaged with one or more hermaphroditic connectors, providing the nose unit with a source of power and establishing communication with other components. This feature is described in greater detail below.

The fact that the nose unit may be easily attached to and detached from the camera assembly may allow for easier maintenance of the nose unit and/or camera assembly. For example, rather than being forced to handle a bulkier, heavier camera assembly to clean the nose, an operator may simply remove the nose from the camera assembly to do so. Moreover, the modular nature of the nose unit may allow one unit to be swapped for another during maintenance so that the camera assembly need not be taken out of operation. Even further, a nose unit 130 may be provided with a retractable handle to assist an operator in detaching the nose unit from the camera assembly.

In one embodiment, nose unit 130 houses, supports and protects the camera assembly's lighting components. For example, nose unit 130 may be largely composed of a sturdy, lightweight material such as aluminum. The nose unit may include a slot 131 near its front face (e.g., the side which faces a mail sorting assembly conveyor path) into which a glass plate 139 may be placed. In one embodiment, the glass plate may be tempered and be treated with a anti-reflective coating that improves its light transmissibility, although the invention is not limited in this respect. The glass pane may, for example, be removable for cleaning or replacement.

In one embodiment, nose unit 130 includes a series of six separate printed circuit cards, each supporting a vertical column of LEDs 135. Of course, lighting components need not be installed on columns, as any support structure may be employed. The invention is not limited to any specific implementation. In addition, as discussed above, LEDs may be employed because their long life span (i.e., 4-5 years under normal operating conditions, as opposed to 1-2 months for fluorescent, halogen or sodium vapor lamps) and low heat output may be advantageous. However, it should be appreciated that the invention is not limited to employing LEDs and that any suitable lighting component may be employed.

In one embodiment, each column of LEDs 135 may be individually positioned to project light at a specific angle toward, or at an area on, an item passing the camera assembly. In one embodiment, each column is separately configurable to project light toward the viewing station at a specific angle. In this manner, light may be projected at an item in the viewing station in a manner which balances the extent to which areas on the item are illuminated and/or which minimizes the amount of light reflected from the item directly back toward the camera lens. In one exemplary arrangement, the outermost columns of LEDs (i.e., those situated furthest from aperture 310) may be positioned to project light toward an item at a more glancing angle than inner columns, such that light reflected back toward camera lens 230 may be minimized. The positioning of LEDs 135 is described in greater detail below with reference to FIG. 7.

In one embodiment, the structure or structures which support LEDs 135 within nose unit 130 may possess high thermal conductivity, which may extend the expected useful life of the LEDs. For example, in one embodiment, the individual supports provided for each column of LEDs are composed of aluminum, which may provide a thermally conductive path between the LEDs and the cover of nose unit 130. In one exemplary implementation, LEDs 135 are mounted on aluminum blocks which are retained by aluminum cradles that contact an aluminum interface plate forming the back of nose unit 130. As such, these structures may provide a path through which heat generated by the LEDs may be conducted to the surface of nose unit 130, such that the heat may dissipate into the surrounding air or on to another surface on which the camera assembly is mounted (e.g., the surface of a mail sorting system). In addition, nose unit 130 may be constructed to provide ample open area for air to move freely within the unit without restriction.

As can be seen in FIG. 3, front frame structure 240 includes aperture 310 having top end 310A and bottom end 310B. In one embodiment, nose unit 130 may also define an aperture (not shown) which approximates aperture 310 in size and position, such that when nose unit 130 is installed on the camera assembly in registration with front frame structure 240, lens 230 is provided with an unobstructed field of view toward the viewing station via the aperture(s). For example, in one embodiment, nose unit 130 includes an assembly which provides mechanical supports for columns of LEDs 135 and also defines an aperture which corresponds to aperture 310 for providing lens 230 with a field of view toward the viewing station. In one embodiment, the height of the aperture(s) is defined to allow lens 230 to view a mail piece of predetermined maximum height at a predetermined distance from the lens in accordance with the length of the lens aperture, such that the camera may view a satisfactory portion of the surface of a flats item.

In one embodiment, back plate 140 is a plate mounted vertically from the surface of base plate 100 via screws. Back plate 140 may, for example, be composed of aluminum. Back plate 140 may include one or more ports for establishing communication and/or electrical conductivity with one or more external devices, and may include an indicator display and/or one or more on/off switches allowing the functions of various components to be disabled. In one exemplary implementation, the port(s) may facilitate communication with external devices such as a tachometer, item presence detector, power source and/or video processor card (e.g., residing in a computer system). For example, an item presence detector may detect when a mail item is approaching the front face of the camera assembly and provide a signal to the camera assembly via one or more of the ports so that LEDs may be turned on to illuminate the mail item. Communication with one or more external devices may also enable real-time calibration of camera and/or lighting components, such as calibration performed according to techniques disclosed in commonly assigned U.S. Pat. No. 6,809,330.

Camera interface board (CIB) 220 provides an electrical and communications link between camera assembly components and external devices, such as those listed immediately above which may communicate with camera assembly components via ports on back plate 140. In one embodiment, CIB 220 constitutes a hub for distributing internal power to each component. CIB 220 may be mounted to back plate 140 and/or base plate 100 via one or more brackets, which may create an electrical grounding path.

Figure 7:
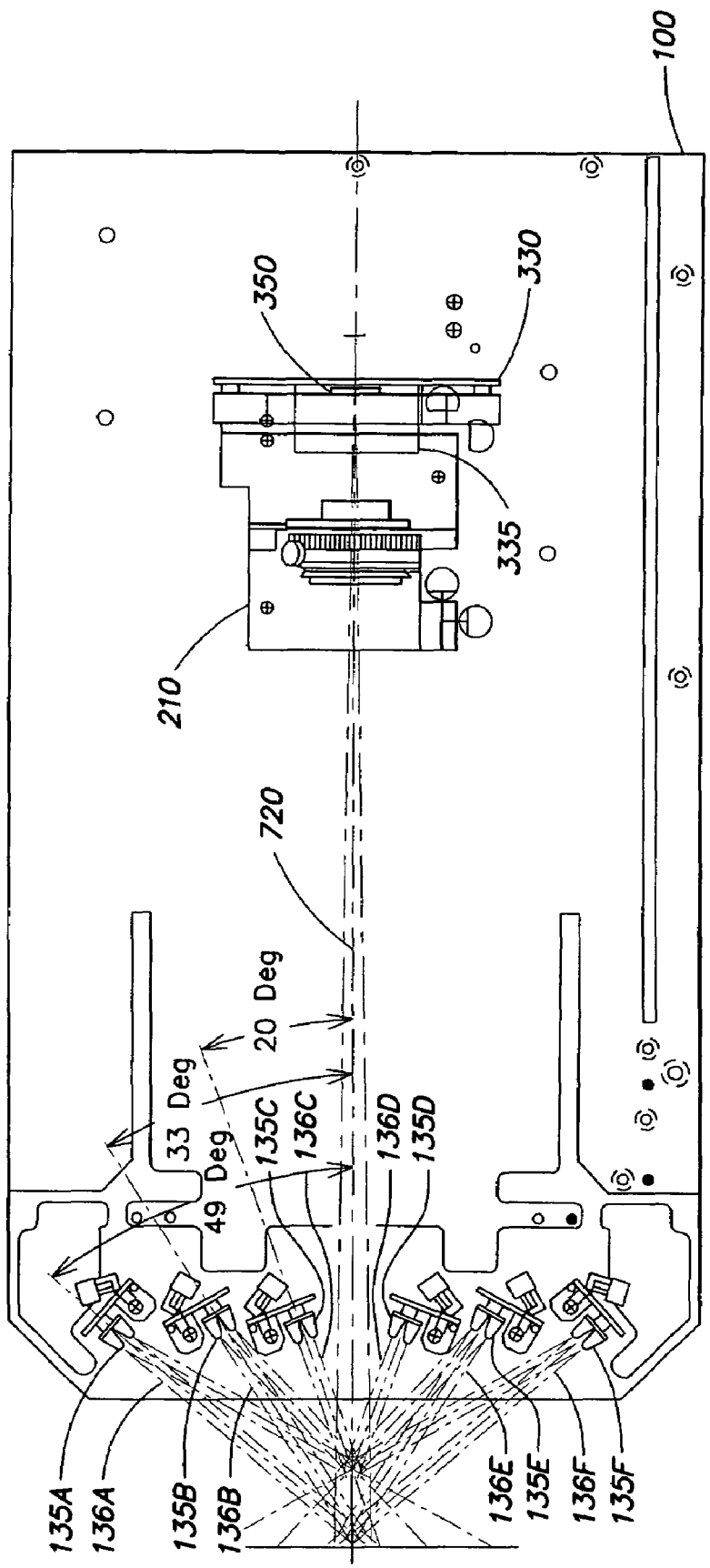
FIG. 7 is a top view of a camera assembly illustrating exemplary angles at which lighting components may direct light toward an item, according to one embodiment of the invention.

An optical bench assembly 205, shown in detail in FIGS. 3-6, includes lens mount 210, adapter block 340, lens 230, array card 330, CCD/TDI chip 350, heat sink 320 and connector housing 335. In one embodiment, lens mount 210 is affixed to base plate 100 via one or more fasteners 215. Lens mount 210 includes grooves 216 for receiving fasteners 215, such that the distance between lens mount 210 and an aperture (and thus the field of view of the camera) may be adjusted. Base plate 100 also includes dowel pins 217 for securing the position of the optical bench with respect to base plate 100. The depicted arrangement may allow the position of lens mount 210 to be adjusted with respect to an aperture to accommodate different system resolutions. For example, a system resolution of 212 or 216 dots per inch (dpi) may be accommodated by affixing lens mount 210 to base plate 100 via fasteners 215 such that lens mount 210 contacts the dowel pins 217 furthest away from the aperture (an example of this arrangement is shown in FIG. 7). A system resolution of 256 dpi may be accommodated by affixing lens mount 210 to base plate 100 closer to an aperture, such that lens mount contacts the dowel pins 217 which are closest to the aperture (an example of this arrangement is shown in FIG. 3).

Array card 330, on which TDI/CCD chip 350 is affixed, is attached to lens mount 210 via adapter block 340. In one embodiment, array card 330 may be affixed to lens mount 210 in either of two orientations, wherein a first orientation provides for scanning of items conveyed past the camera assembly in a left-to-right direction and a second orientation provides for scanning of items conveyed in a right-to-left direction. In one embodiment, to switch between the orientations, the heat sink, array card and chip may simply be detached from lens mount 210, turned upside down, and reattached to lens mount 210 via adapter block 340.

FIG. 7 illustrates an exemplary manner in which LEDs 135 may be positioned within nose unit 130 to reduce the specular reflection which can be created when light is projected toward an item. As discussed above, conventional lighting components such as fluorescent, halogen or sodium vapor lamps are typically glowing bulbs that are incapable of directing light toward an item at a specific angle. As a result, these bulbs may cause light to be reflected directly at the camera lens, which can result in degraded image quality. This is particularly true where an item's surface is irregularly shaped, such as with items which are windowed (e.g., with cellophane) or wrapped in plastic or polyethylene (which has a tendency to wrinkle and crease).

In one embodiment of the invention illustrated in FIG. 7, LEDs 135 each direct a path of light 136 toward an item at a substantially fixed, configurable angle of incidence. Because the angle of incidence defines the light's angle of reflection, positioning LEDs 135 to direct light toward an item at more glancing angles (i.e., closer to parallel to the surface of an item) may minimize the amount of light reflected directly from the item toward the camera lens. For example, in the arrangement shown in FIG. 7, nose unit 130 includes outer LED columns 135A and 135F, middle LED columns 135B and 135E, and inner LED columns 135C-135D. Outer LED columns 135A and 135F are positioned to direct light toward an item at a 49 degree angle to line of view 720, middle LED columns 135B and 135E are positioned to direct light at a 33 degree angle to line of view 720, and inner LED columns 135C and 135D are positioned to direct light at a 20 degree angle to line of view 720.

Of course, not all LEDs in a column need to be positioned to direct light at an item at the same angle, and columns which oppose each other (e.g., columns 135A and 135F) need not be positioned at the same angle with respect to a focus axis. Each support structure may be separately configurable to suit different operating conditions and/or other objectives. The exemplary angles shown in FIG. 7 may be set, for example, to ensure that an item is properly illuminated but also to minimize the amount of specular reflection perceived by the lens and CCD. The positions of any LED may be modified to suit specific operating conditions, as the invention is not limited in this respect.

Although the exemplary arrangement shown in FIG. 7 includes six LED columns, it should be appreciated that any number of LEDs or columns thereof may be employed. For example, using the arrangement of FIG. 7 to illustrate, inner LED columns 135C-135D could be removed if particularly reflective items are to be photographed, since the angle at which these LEDs direct light toward an item may make it more likely that light will be reflected back toward the lens under certain operating conditions (e.g. where the surface of the item is more irregularly shaped than normal). Any suitable arrangement of LEDs may be implemented, as the invention is not limited in this respect.

It should also be appreciated that because any or all of the lighting components may be adjusted by an operator and nose unit 130 may be easily detached and reattached, different nose units 130 may be configured to suit different operating conditions and swapped for one another as desired. For example, a first nose unit could be configured to illuminate particularly reflective items (e.g., those wrapped in polyethylene tending to wrinkle or crease) and another could be configured to illuminate other items for which different lighting angles or intensities may be appropriate.

It should further be appreciated that although much of the foregoing description includes references to LED lighting components, the invention is not limited in this respect, as any suitable lighting component may be employed.

What is claimed is:

1. A camera assembly for use in a mail processing system, the camera assembly comprising a camera with a line of view via an aperture toward a viewing station in the mail processing system, the mail processing system being configured to transport a mail item through the viewing station in a direction which is substantially perpendicular to the line of view of the camera, the camera assembly comprising a plurality of lighting components configured to project light toward the viewing station, the plurality of lighting components being disposed to project light toward the viewing station such that the light does not travel via the aperture, each of the plurality of lighting components being configured to project light toward the viewing station at a substantially precise acute angle of at least twenty degrees from the line of view, the plurality of lighting components comprising first and second groups of lighting components oriented to project light toward the viewing station at respective first and second angles, the first angle being different than the second angle.

2. The camera assembly of claim 1, wherein at least one of the first angle and the second angle is at least thirty-tree degrees from the line of view.

3. The camera assembly of claim 1, wherein at least one of the first angle and the second angle is at least forty-nine degrees from the line of view.

4. The camera assembly of claim 1, wherein the plurality of lighting components comprise light-emitting diodes, 5. The camera assembly of claim 4, wherein the light-emitting diodes are white light-emitting diodes.

6. The camera assembly of claim 1, further comprising a housing and a nose unit which may be attached and detached from the housing, and wherein the plurality of lighting components reside in the nose unit.

7. The camera assembly of claim 6, wherein the nose unit comprises a face through which the plurality of lighting components project light toward the viewing station.

8. The camera assembly of claim 1, wherein at least one of the first and second groups of lighting components is arranged in at least one column disposed parallel to the aperture.

9. The camera assembly of claim 8, wherein each of the first and second groups of lighting components is separately configurable to project light toward the item at an angle with respect to the line of view.

10. The camera assembly of claim 1, wherein the aperture is suitably sized to provide the camera with a view of a height of a flats item.

* * * * *